United States Patent
Dsouza et al.

(10) Patent No.: US 10,623,779 B2
(45) Date of Patent: Apr. 14, 2020

(54) METHOD FOR PROCESSING IMAGE USING DYNAMIC RANGE OF COLOR COMPONENT, AND DEVICE THEREFOR

(71) Applicant: SAMSUNG ELECTRONICS CO., LTD., Suwon-si (KR)

(72) Inventors: Amith Dsouza, Bangalore (IN); Aishwarya Aishwarya, Ranchi (IN); Kulbhushan Pachauri, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 42 days.

(21) Appl. No.: 15/765,173

(22) PCT Filed: Oct. 26, 2016

(86) PCT No.: PCT/KR2016/012076
§ 371 (c)(1),
(2) Date: Mar. 30, 2018

(87) PCT Pub. No.: WO2017/074016
PCT Pub. Date: May 4, 2017

(65) Prior Publication Data
US 2018/0278965 A1  Sep. 27, 2018

(30) Foreign Application Priority Data

Oct. 26, 2015 (IN) .......................... 5746/CHE/2015
Jan. 4, 2016 (IN) .......................... 201641000215
Oct. 21, 2016 (IN) .......................... 5746/CHE/2015

(51) Int. Cl.
*H04N 19/85* (2014.01)
*H04N 19/124* (2014.01)
(Continued)

(52) U.S. Cl.
CPC .......... *H04N 19/85* (2014.11); *H04N 19/124* (2014.11); *H04N 19/186* (2014.11); *H04N 9/68* (2013.01)

(58) Field of Classification Search
CPC ..... H04N 19/85; H04N 19/124; H04N 19/186
(Continued)

(56) References Cited

U.S. PATENT DOCUMENTS

| 7,536,059 B2 | 5/2009 | Xu et al. |
| 9,549,207 B2 | 1/2017 | Su et al. |

(Continued)

FOREIGN PATENT DOCUMENTS

| KR | 100754187 B1 | 9/2007 |
| KR | 1020090058955 A | 6/2009 |

(Continued)

OTHER PUBLICATIONS

Written Opinion (PCT/ISA/237) dated Feb. 8, 2017, by the International Searching Authority in counterpart International Application No. PCT/KR2016/012076.
(Continued)

*Primary Examiner* — Patricia I Young
(74) *Attorney, Agent, or Firm* — Sughrue Mion, PLLC

(57) ABSTRACT

The present disclosure proposes an image processing method according to an embodiment. The image processing method includes the operations of obtaining a color component value from an input image, determining a dynamic range of the obtained color component value, determining a scaling factor for converting the dynamic range of the color component value, based on the determined dynamic range of the color component value and a permissible range of the color component value, and scaling the color component value, based on the determined scaling factor.

15 Claims, 9 Drawing Sheets

(51) Int. Cl.
*H04N 19/186* (2014.01)
*H04N 9/68* (2006.01)

(58) Field of Classification Search
USPC .................................................. 375/240.26
See application file for complete search history.

(56) References Cited

U.S. PATENT DOCUMENTS

2009/0147856 A1    6/2009  Song et al.
2017/0310981 A1*  10/2017  Agostinelli .......... H04N 19/117

FOREIGN PATENT DOCUMENTS

| | | |
|---|---|---|
| KR | 1020110126133 A | 11/2011 |
| KR | 1020150091149 A | 8/2015 |
| WO | 2015143671 A1 | 10/2015 |

OTHER PUBLICATIONS

International Search Report (PCT/ISA/210), dated Feb. 8, 2017, by International Searching Authority in counterpart International Application No. PCT/KR2016/012076.

\* cited by examiner

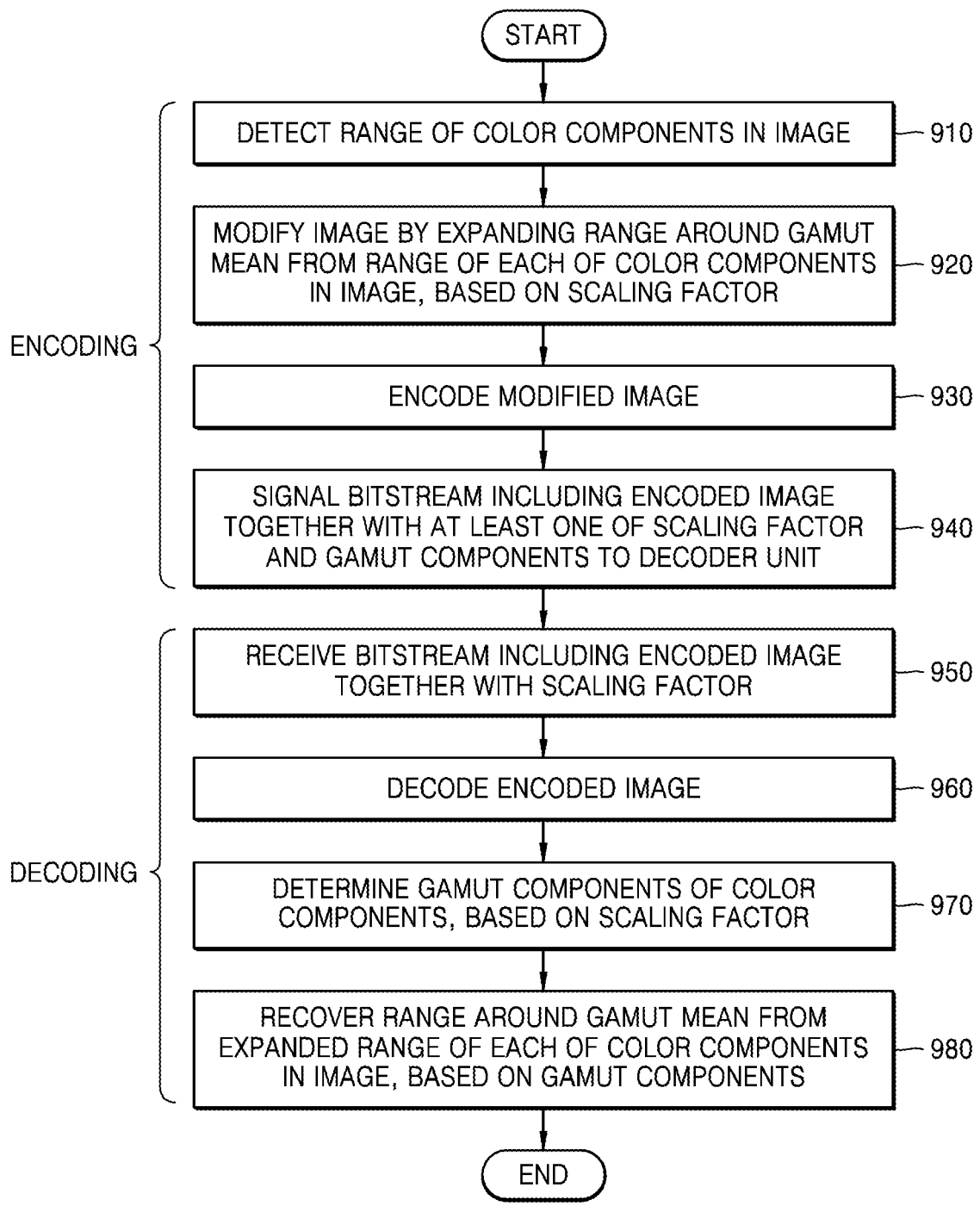

METHOD FOR PROCESSING IMAGE USING DYNAMIC RANGE OF COLOR COMPONENT, AND DEVICE THEREFOR

TECHNICAL FIELD

The present disclosure relates to image processing, and more particularly, to a method and apparatus for image processing based on a dynamic range of color components included in an image.

BACKGROUND ART

In general, video codecs process fixed-point data. Pixel values of an input image are converted from a floating point to a fixed-point through quantization. During the quantization, considerable losses occur due to precision loss.

According to the conventional art, a received high dynamic range (HDR) image includes 16-bit data captured in a linear light format in a 4:4:4 Red Green Blue (RGB) color space with floating point accuracy.

Data that constitutes an image is converted from a half-precision floating-point 4:4:4 RGB linear-light format to a single-precision floating-point 4:4:4 format and then mapped to an R'G'B' value of a floating point format by using a perceptual quality (PQ) transfer function.

The mapped R'G'B' value is converted to Y'CbCr color spaces in a floating point format. Further, the Y'CbCr (float) color spaces in a floating point format are converted to 10-bit fixed point format $(Dy'Dc_bDc_r)$. The 10-bit fixed point format $(Dy'Dc_bDc_r)$ is down-sampled from 4:4:4 to 4:2:0. The down-sampled data is encoded by an encoder. The encoder sends the encoded data in a bitstream to a decoder.

The decoder receives the encoded bitstream and up-samples the encoded bitstream from the 4:2:0 format to the 4:4:4 format. The up-sampled data in the 10-bit fixed point format $(Dy'Dc_bDc_r)$ is de-quantized to data of the Y'CbCr color space in the floating point format. The de-quantized data is converted from values of the Y'CbCr color space in the floating point format to R'G'B' values. The R'G'B' values may be converted from the single-precision floating-point format to the half-precision floating-point 4:4:4 RGB linear-light format and may be remapped to the values of the 4:4:4 RGB color space with floating point accuracy by using an inverse PQ transfer function. Data of the 4:4:4 RGB color space with floating point accuracy constitutes an output image.

DETAILED DESCRIPTION OF THE INVENTION

Technical Problem

The present disclosure provides an image processing method and apparatus for improving the quality of an image by reducing precision loss during a quantization process.

Technical Solution

According to an aspect of the present invention, there is provided an image processing method including obtaining a color component value from an input image; determining a dynamic range of the obtained color component value; determining a scaling factor for converting the dynamic range of the color component value, based on the determined dynamic range of the color component value and a permissible range of the color component value; and scaling the color component value, based on the determined scaling factor.

According to another aspect of the present invention, there is provided an image processing apparatus including a storage storing a color component value obtained from an input image; and at least one processor configured to determine a dynamic range of the obtained color component value, determine a scaling factor for converting the dynamic range of the color component value, based on the determined dynamic range of the color component value and a permissible range of the color component value, and scale the color component value, based on the determined scaling factor.

Advantageous Effects of the Invention

The present disclosure may provide a method and an apparatus of applying scaling and an offset to pixels within an image in order to improve the quality of an image.

DESCRIPTION OF THE DRAWINGS

FIG. 9 is a flowchart of a method of color management of an image, according to an embodiment.

BEST MODE

Figure 1:
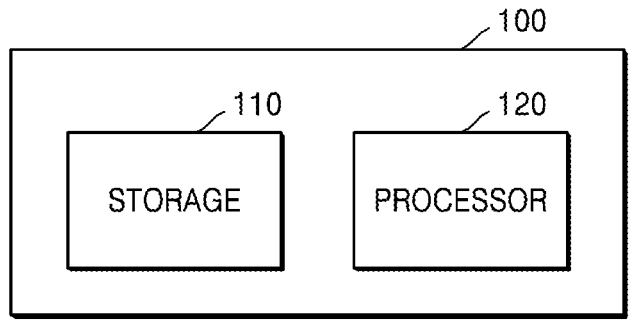
FIG. 1 is a block diagram of an image processing apparatus which converts a dynamic range of color components, according to an embodiment.

An image processing method according to an embodiment of the present disclosure may include obtaining a color component value from an input image;

determining a dynamic range of the obtained color component value; determining a scaling factor for converting the dynamic range of the color component value, based on the determined dynamic range of the color component value and a permissible range of the color component value; and scaling the color component value, based on the determined scaling factor.

The image processing method may further include changing a format of the scaled color component value by quantization based on the converted dynamic range of the scaled color component value; and encoding the quantized input image.

The image processing method may further include generating a bitstream including the encoded input image and the scaling factor.

The determining of the scaling factor may include determining, as the scaling factor, a smaller ratio size from among a ratio size of an upper limit of the permissible range to an upper limit of the color component corresponding to the dynamic range and a ratio size of a lower limit of the permissible range to a lower limit of the color component corresponding to the dynamic range.

The determining of the scaling factor may include determining, as the scaling factor, a ratio of a difference between an upper limit and a lower limit of the permissible range to a difference between an upper limit and a lower limit of the color component corresponding to the dynamic range.

An image processing apparatus according to an embodiment of the present disclosure may include a storage storing a color component value obtained from an input image; and at least one processor configured to determine a dynamic range of the obtained color component value, determine a scaling factor for converting the dynamic range of the color component value, based on the determined dynamic range of the color component value and a permissible range of the color component value, and scale the color component value, based on the determined scaling factor.

The processor may be further configured to determine, as the scaling factor, a smaller ratio size from among a ratio size of an upper limit of the permissible range to an upper limit of the color component corresponding to the dynamic range and a ratio size of a lower limit of the permissible range to a lower limit of the color component corresponding to the dynamic range.

The processor may be further configured to determine, as the scaling factor, a ratio of a difference between an upper limit and a lower limit of the permissible range to a difference between an upper limit and a lower limit of the color component corresponding to the dynamic range.

An image processing method according to an embodiment of the present disclosure may include obtaining an encoded image and a scaling factor from a received bitstream; obtaining a quantized image by decoding the encoded image; obtaining a color component value scaled based on the scaling factor, by dequantizing the quantized image; and inversely scaling the scaled color component value, based on the scaling factor.

The image processing method may further include obtaining an upper limit and a lower limit of a color component corresponding to a dynamic range of an unscaled color component value from the bitstream, wherein the inverse scaling of the scaled color component value may include inversely scaling the scaled color component value, based on the scaling factor and the upper limit and the lower limit of the color component corresponding to the dynamic range.

The scaling factor may be a smaller ratio size from among a ratio size of an upper limit of a permissible range of a color component value obtained from an input image to an upper limit of a color component corresponding to a dynamic range and a ratio size of a lower limit of the permissible range to a lower limit of the color component corresponding to the dynamic range.

The scaling factor may be a ratio of a difference between an upper limit and a lower limit of a permissible range of a color component value obtained from an input image to a difference between an upper limit and a lower limit of a color component corresponding to a dynamic range of the color component value.

An image processing apparatus according to an embodiment of the present disclosure may include an obtainer configured to obtain an encoded image and a scaling factor from a bitstream; and at least one processor configured to obtain a quantized image by decoding the encoded image, obtain a color component value scaled based on the scaling factor, by dequantizing the quantized image, and inversely scale the scaled color component value, based on the scaling factor.

The processor may be further configured to obtain an upper limit and a lower limit of a color component corresponding to a dynamic range of an unscaled color component value from the bitstream, and inversely scale the scaled color component value, based on the scaling factor and an upper limit and a lower limit of a color component corresponding to the dynamic range.

A non-transitory computer-readable recording medium may have recorded thereon a program, which, when executed by a computer, performs an image processing method according to an embodiment of the present disclosure.

MODE OF THE INVENTION

Various features described in the specification will be clearly understood through the drawings and the descriptions of the present disclosure. Processes, apparatuses, manufacturing, and modifications thereof specified in the present disclosure are for description. The above-described structural and functional details should be interpreted as a representative basic illustration for teaching one of ordinary skill in the art to employ the above-described features in various and suitable detailed structures, and should not be interpreted in a direction of restricting the right scope of the invention. Terms and phrases used herein are not for restricting the right scope of the invention but for describing the above-described features for better understanding.

FIG. 1 is a block diagram of an image processing apparatus 100 which converts a dynamic range of color components, according to an embodiment.

Referring to FIG. 1, the image processing apparatus 100 may include a storage for storing an input image, and a processor 120. The storage 110 and the processor 120 according to an embodiment may be electrically connected to each other via a bus or the like. Only components related with the present embodiment from among the components of the image processing apparatus 100 are shown in FIG. 1. It will be understood by one of ordinary skill in the art related with the present embodiment that general-use components other than the components illustrated in FIG. 1 may be further included.

The aforementioned components will now be described in detail.

According to an embodiment, the processor 120 may store the input image in the storage 110. For example, the input image may be, but is not limited to, a high dynamic range (HDR) image. The processor 120 may store, in the storage 110, Red Green Blue (RGB) signal data for pixels that constitute the input image. For example, the processor 120 may store, in the storage 110, Y'CbCr signal data for the pixels that constitute the input image.

According to an embodiment, the processor 120 may include, but is not limited to, at least one processor, such as a central processing unit (CPU) and a graphics processing unit (GPU).

According to an embodiment, the processor 120 may obtain an RGB signal for the pixels that constitute the input image. For example, the processor 120 may obtain the RGB signal for the pixels that constitute the input image stored in the storage 110. Further, the processor 120 may convert a color space from the RGB signal for the pixels that constitute the received input image to the Y'CbCr signal. The processor 120 may obtain color component values from the Y'CbCr signal for the pixels that constitute the input image.

The processor 120 may determine a dynamic range of the color component values obtained from the input image.

According to an embodiment, to determine the dynamic range of the color component values, the processor 120 may determine an upper limit of the color components corresponding to the dynamic range and a lower limit of the color components corresponding to the dynamic range, based on the obtained color component values. For example, the processor 120 may determine a maximum value from among the obtained color component values to be the upper limit of the color components corresponding to the dynamic range. The processor 120 may determine a minimum value from among the obtained color component values to be the lower limit of the color components corresponding to the dynamic range.

According to an embodiment, the processor 120 may determine the dynamic range of the color component values, based on the determined upper and lower limits of the color component values. The processor 120 may determine a ratio of the determined upper limit of the color component values to the determined lower limit thereof to be the dynamic range of the color component values. For example, the processor 120 may determine a ratio of the maximum value from among the obtained color component values to the minimum value to be the dynamic range of the color component values.

According to an embodiment, the processor 120 may determine the dynamic range of the color component values in units of one picture, at least one picture, one scene, or one image, but embodiments are not limited thereto. For example, to determine the dynamic range of the color component values for each picture, the processor 120 may determine the dynamic range, based on a minimum value and a maximum value from among color component values obtained from each picture. Similarly, the processor 120 may determine a scaling factor of each unit for which the dynamic range is determined, and may scale the color component values belonging to the unit, based on the determined scaling factor.

According to an embodiment, in the Y'CbCr format, the color components may represent a chroma component, but embodiments are not limited thereto. For example, in the Y'CbCr format, the processor 120 may determine the dynamic range for each of a red-difference chroma component and a blue-difference chroma component that constitute the Y'CbCr signal. Similarly, the processor 120 may determine the scaling factor for each of the red-difference chroma component and the blue-difference chroma component, and may scale the red-difference chroma component value and the blue-difference chroma component value based on the determined scaling factors.

The processor 120 may determine a scaling factor for converting the dynamic range of the color component values based on the determined dynamic range of the color component values and a permissible range of the color component values.

In the present application, the permissible range of the color component values may mean the range of values that the color component values may have. For example, in the Y'CbCr format, each of the color components may have a value in a range of −0.5 to 0.5. In the Y'CbCr format, an upper limit of the permissible range of the color components may represent 0.5, and a lower limit of the permissible range of the color components may represent −0.5.

The processor 120 may determine the scaling factor, based on the upper limit and the lower limit of the color components corresponding to the dynamic range and the upper limit and the lower limit of the permissible range of the color components.

According to an embodiment, the processor 120 may determine, as the scaling factor, a smaller ratio size from among a ratio size of the upper limit of the permissible range to the upper limit of the color components corresponding to the dynamic range and a ratio size of the lower limit of the permissible range to the lower limit of the color components corresponding to the dynamic range. For example, when the upper limit of the color components corresponding to the dynamic range in the Y'CbCr format is 0.4 and the lower limit thereof is 0.2, the processor 120 may determine, as the scaling factor, 1.25 being a smaller ratio size from among 1.25 being a ratio size of 0.5 being the upper limit of the permissible range to 0.4 being the upper limit of the color components corresponding to the dynamic range and 2.5 being a ratio size of −0.5 being the lower limit of the permissible range to 0.2 being the lower limit of the color components corresponding to the dynamic range.

According to an embodiment, the processor 120 may determine, as the scaling factor, a ratio of a difference between the upper limit and the lower limit of the permissible range to a difference between the upper limit and the lower limit of the color components corresponding to the dynamic range. For example, when the upper limit of the dynamic range in the Y'CbCr format is 0.4 and the lower limit thereof is 0.2, the processor 120 may determine, as the scaling factor, 5 being a ratio of 1 being a difference between the upper limit and the lower limit of the permissible range to 0.2 being a difference between the upper limit and the lower limit of the dynamic range.

The processor 120 may scale the color component values, based on the determined scaling factor.

The processor 120 may scale color component values for the pixels that constitute the input image, based on the determined scaling factor. The processor 120 may convert the dynamic range of the color component values for the pixels that constitute the input image, via scaling.

The processor 120 may perform quantization, based on the converted dynamic range. For example, when the input image is an HDR image, the processor 120 may convert data in a floating-point format to data in a fixed-point format via quantization. As the dynamic range of the color component values increases via scaling, the processor 120 may increase the number of quantization steps.

The processor 120 may encode a quantized input image. For example the processor 120 may encode a quantized input image including the data in the fixed-point format.

The processor 120 may generate a bitstream including the encoded input image and the scaling factor. According to an embodiment, the processor 120 may generate a bitstream including the encoded input image, the scaling factor, and the upper limit and the lower limit of the color components corresponding to the dynamic range. For example, the processor 120 may generate meta data including the scaling factor and/or the upper limit and the lower limit of the color components corresponding to the dynamic range.

Figure 2:
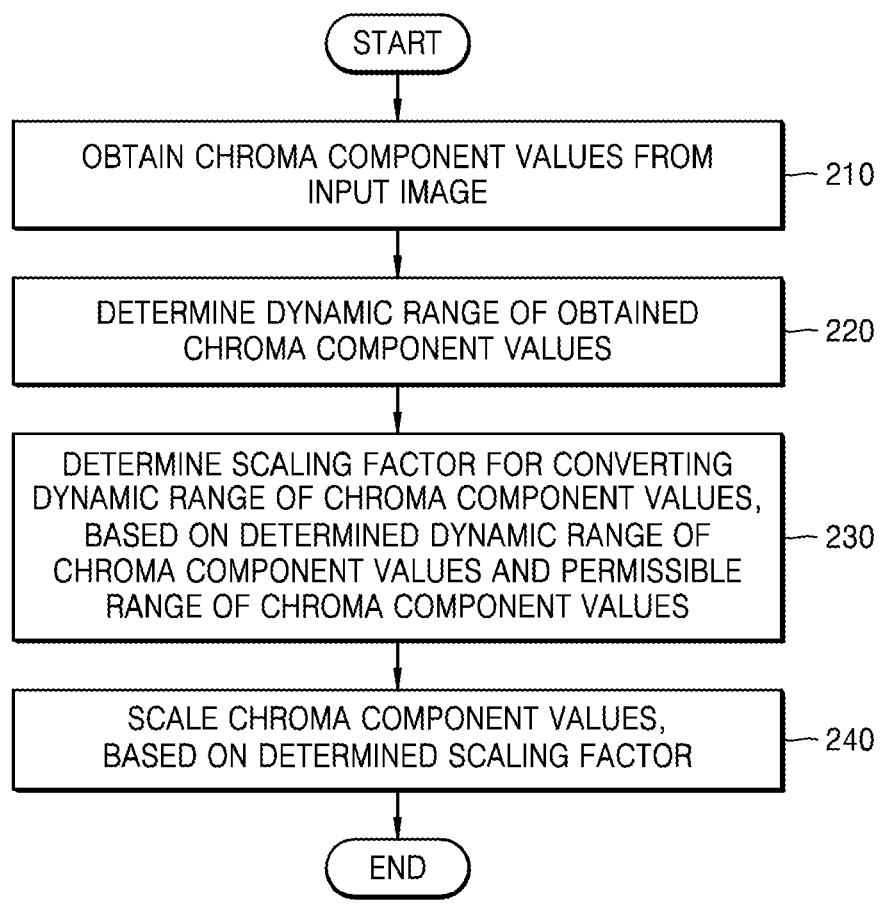
FIG. 2 is a flowchart of a method, performed by the image processing apparatus, of converting the dynamic range of the color components, according to an embodiment.

FIG. 2 is a flowchart of a method, performed by the image processing apparatus 100, of converting the dynamic range of the color components, according to an embodiment.

In operation 210, the image processing apparatus 100 may obtain the color component values from the input image.

The image acquisition device 100 may obtain the RGB signal for the pixels that constitute the input image. The image processing apparatus 100 may convert a color space from the RGB signal for the pixels that constitute the input image to the Y'CbCr signal. The image processing apparatus 100 may obtain the color component values from the Y'CbCr signal for the pixels that constitute the input image.

In operation 220, the image processing apparatus 100 may determine the dynamic range of the color component values obtained from the input image.

According to an embodiment, to determine the dynamic range of the color component values, the image processing apparatus 100 may determine the upper limit of the color components corresponding to the dynamic range and the lower limit of the color components corresponding to the dynamic range, based on the obtained color component values. For example, the image processing apparatus 100 may determine the maximum value from among the obtained color component values to be the upper limit of the color components corresponding to the dynamic range. The image processing apparatus 100 may determine the minimum value from among the obtained color component values to be the lower limit of the color components corresponding to the dynamic range.

According to an embodiment, the image processing apparatus 100 may determine the dynamic range of the color component values, based on the determined upper and lower limits of the color component values. The image processing apparatus 100 may determine a ratio of the determined upper limit of the color component values to the determined lower limit thereof to be the dynamic range of the color component values. For example, the image processing apparatus 100 may determine a ratio of the maximum value from among the obtained color component values to the minimum value to be the dynamic range of the color component values.

According to an embodiment, the image processing apparatus 100 may determine the dynamic range of the color component values in units of one picture, at least one picture, one scene, or one image, but embodiments are not limited thereto. For example, to determine the dynamic range of the color component values for each picture, the image processing apparatus 100 may determine the dynamic range, based on the minimum value and the maximum value from among the color component values obtained from each picture. Similarly, the image processing apparatus 100 may determine a scaling factor of each unit for which the dynamic range is determined, and may scale the color component values belonging to the unit, based on the determined scaling factor.

For example, in the Y'CbCr format, the image processing apparatus 100 may determine the dynamic range for each of a red-difference chroma component and a blue-difference chroma component that constitute the Y'CbCr signal. Similarly, the image processing apparatus 100 may determine the scaling factor for each of the red-difference chroma component and the blue-difference chroma component, and may scale the red-difference chroma component value and the blue-difference chroma component value based on the determined scaling factors.

In operation 230, the image processing apparatus 100 may determine a scaling factor for converting the dynamic range of the color component values based on the determined dynamic range of the color component values and the permissible range of the color component values.

The image processing apparatus 100 may determine the scaling factor, based on the upper limit and the lower limit of the color components corresponding to the dynamic range and the upper limit and the lower limit of the permissible range of the color components.

In operation 240, the image processing apparatus 100 may scale the color component values, based on the determined scaling factor.

The image processing apparatus 100 may scale the color component values for the pixels that constitute the input image, based on the determined scaling factor. The image processing apparatus 100 may convert the dynamic range of the color component values for the pixels that constitute the input image, via scaling.

Figure 3:
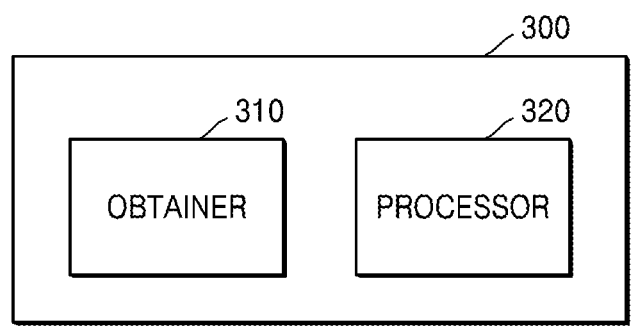
FIG. 3 is a block diagram of an image processing apparatus which recovers a dynamic range of color components, according to an embodiment.

FIG. 3 is a block diagram of an image processing apparatus 300 which recovers a dynamic range of color components, according to an embodiment.

Referring to FIG. 3, the image processing apparatus 300 may include an obtainer 310 that obtains a bitstream, and a processor 320. The obtainer 310 and the processor 320 according to an embodiment may be electrically connected to each other via a bus or the like. Only components related with the present embodiment from among the components of the image processing apparatus 300 are shown in FIG. 3. It will be understood by one of ordinary skill in the art related with the present embodiment that general-use components other than the components illustrated in FIG. 3 may be further included.

The aforementioned components will now be described in detail.

The obtainer 310 may obtain an encoded image and a scaling factor from the bitstream.

According to an embodiment, the obtainer 310 may obtain an encoded input image and a scaling factor from the bitstream. According to another embodiment, the obtainer 310 may obtain the encoded input image, the scaling factor, and an upper limit and a lower limit of color components corresponding to the dynamic range of the color component values that constitute an input image from the bitstream. According t another embodiment, the obtainer 310 may generate meta data including the scaling factor and/or the upper limit and the lower limit of the color components corresponding to the dynamic range.

According to an embodiment, the processor 120 may include, but is not limited to, at least one processor, such as a CPU and a GPU.

The processor 320 may decode the encoded image to obtain the color component values.

The processor 320 may decode the encoded image to obtain the color component values scaled based on the scaling factor. According to an embodiment, the processor 320 may decode the encoded image to obtain the color component values of a fixed-point format.

The processor 320 may perform dequantization on the obtained color component values. According to an embodiment, the processor 320 may obtain color component values of which a fixed-point format has been converted to a floating-point format, via the dequantization.

According to an embodiment, the obtained color component values in the floating-point format may be color component values scaled according to the method described above with reference to FIG. 2, but embodiments are not limited thereto. Further, the processor 320 may obtain the upper limit and the lower limit of the color components corresponding to the dynamic range of the color component values that constitute the input image. According to an embodiment, the processor 320 may obtain an upper limit and a lower limit of color components corresponding to a dynamic range of not-yet scaled color component values from the received bitstream. According to another embodiment, the processor 320 may obtain an upper limit and a lower limit of color components corresponding to a dynamic range of decoded color component values.

The processor 320 may inverse-scale the color component values, based on the obtained scaling factor. According to an embodiment, the processor 320 may inverse scale the color component values, based on the obtained scaling factor and the upper limit and the lower limit of the color components corresponding to the dynamic range of the not-yet scaled color component values. The processor 320 may recover the dynamic range of the not-yet-scaled color component values via inverse scaling.

The processor 320 may obtain a dynamic range-recovered image by inversely scaling the color component values.

According to an embodiment, the processor 320 may convert the values of the color components in the obtained Y'CbCr color space to color component values in a RGB color space. The processor 320 may obtain an image, based on the color component values in the RGB color space.

The image processing apparatus 320 may perform inverse scaling on the color component values in units of one picture, at least one picture, one scene, or one image, and may recover the dynamic range of the color component values belonging to the unit, but embodiments are not limited thereto. Similarly, the processor 320 may perform inverse scaling on the color component values belonging to a unit for which the dynamic range is recovered, based on a scaling factor corresponding to the unit.

The processor 320 may recover the dynamic range for each of a red-difference chroma component and a blue-difference chroma component that constitute the Y'CbCr signal. Similarly, the processor 320 may perform inverse scaling on each of the red-difference chroma component value and the blue-difference chroma component value, based on the scaling factor for each of the red-difference chroma component and the blue-difference chroma component.

Figure 4:
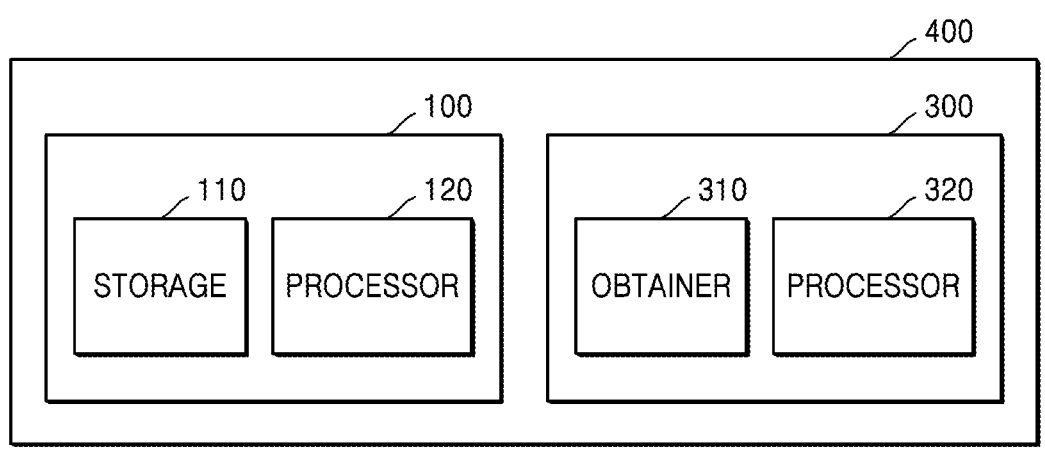
FIG. 4 is a block diagram of an image processing system according to an embodiment.

FIG. 4 is a block diagram of an image processing system 400 according to an embodiment.

Referring to FIG. 4, the system 400 may include the image processing apparatus 100 converting the dynamic range of the color components of the input image, and the image processing apparatus 300 decoding the encoded image and recovering the dynamic range of the converted color components to obtain an output image.

The components of the system 400 will now be sequentially described.

According to an embodiment, the storage 110 may store the input image.

According to an embodiment, the processor 120 may obtain the RGB signal for the pixels that constitute the input image. For example, the processor 120 may obtain the RGB signal for the pixels that constitute the input image stored in the storage 110. Further, the processor 120 may convert a color space from the RGB signal for the pixels that constitute the received input image to the Y'CbCr signal. The processor 120 may obtain color component values from the Y'CbCr signal for the pixels that constitute the input image.

The processor 120 may determine a dynamic range of the color component values obtained from the input image.

According to an embodiment, to determine the dynamic range of the color component values, the processor 120 may determine an upper limit of the color components corresponding to the dynamic range and a lower limit of the color components corresponding to the dynamic range, based on the obtained color component values.

According to an embodiment, the processor 120 may determine the dynamic range of the color component values, based on the determined upper and lower limits of the color component values. The processor 120 may determine a ratio of the determined upper limit of the color component values to the determined lower limit thereof to be the dynamic range of the color component values.

The processor 120 may determine a scaling factor for converting the dynamic range of the color component values based on the determined dynamic range of the color component values and a permissible range of the color component values.

The processor 120 may scale the color component values, based on the determined scaling factor. The processor 120 may scale the color component values for the pixels that constitute the input image, based on the determined scaling factor. The processor 120 may convert the dynamic range of the color component values for the pixels that constitute the input image, via scaling.

The processor 120 may perform quantization, based on the converted dynamic range. The processor 120 may encode a quantized input image. The processor 120 may generate a bitstream including the encoded input image and the scaling factor. According to an embodiment, the processor 120 may generate a bitstream including the encoded input image, the scaling factor, and the upper limit and the lower limit of the color components corresponding to the dynamic range.

The image processing apparatus 300 that obtains the output image from the bitstream generated by the image processing apparatus 100 will now be described.

The image processing apparatus 300 may include the obtainer 310 that obtains the bitstream, and the processor 320.

The obtainer 310 may obtain the bitstream including the encoded image and the scaling factor.

According to an embodiment, the obtainer 310 may obtain the encoded input image and the scaling factor from the bitstream. According to another embodiment, the obtainer 310 may obtain the encoded input image, the scaling factor, and an upper limit and a lower limit of color components corresponding to the dynamic range of the color component values that constitute an input image from the bitstream. According t another embodiment, the obtainer 310 may generate meta data including the scaling factor and/or the upper limit and the lower limit of the color components corresponding to the dynamic range.

The processor 320 may decode the encoded image to obtain the color component values. The processor 320 may perform dequantization on the obtained color component values. The processor 320 may obtain scaled color component values by inversely scaling the obtained color component values.

Further, the processor 320 may obtain the upper limit and the lower limit of the color components corresponding to the dynamic range of the color component values that constitute the input image. According to an embodiment, the processor 320 may obtain an upper limit and a lower limit of color components corresponding to a dynamic range of not-yet scaled color component values from the received bitstream. According to another embodiment, the processor 320 may obtain an upper limit and a lower limit of color components corresponding to a dynamic range of decoded color component values.

The processor 320 may inversely scale the scaled color component values, based on the obtained scaling factor. The processor 320 may recover the dynamic range of the not-yet-scaled color component values via inverse scaling. The processor 320 may obtain an output image including the color component values of which a dynamic range has been recovered.

Figure 5:
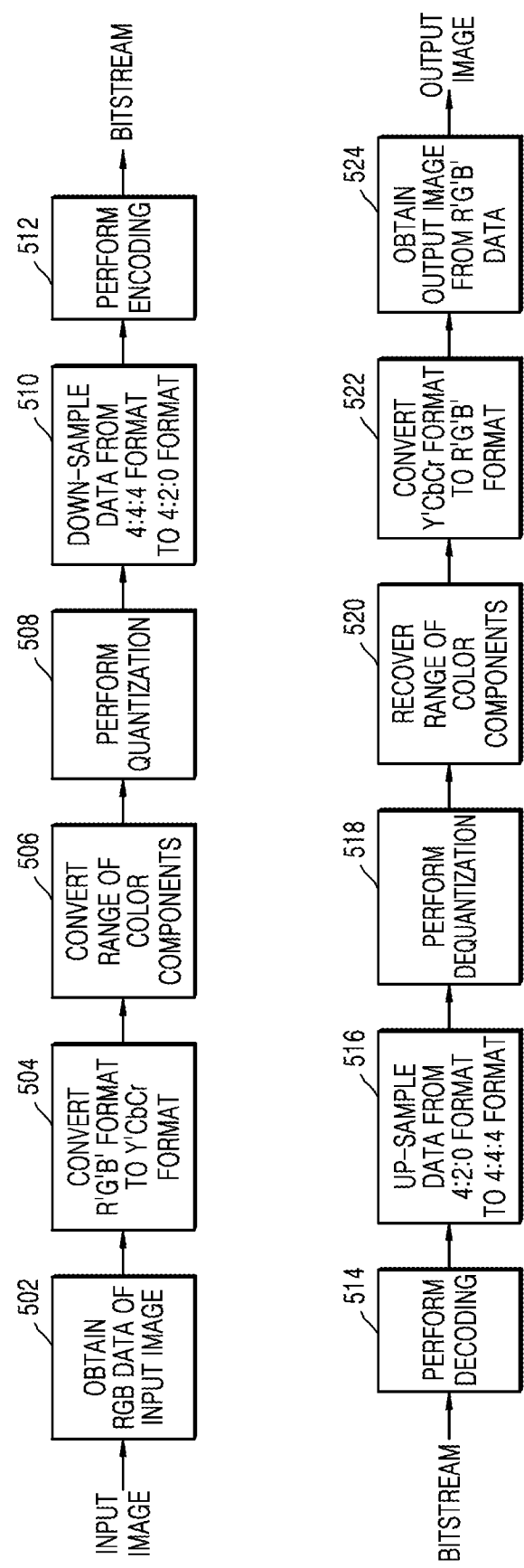
FIG. 5 is a flowchart of a method of converting and recovering a range of a color component, according to an embodiment.

FIG. 5 is a flowchart of a method of converting and recovering a range of a color component, according to an embodiment.

Unlike to the conventional art, the proposed method may include modifying an HDR image to improve the qualities of an HDR image, a wide color gamut (WCG) image, and video compression, as detailed in the FIG. 5.

In operation 502, the image processing apparatus 100 according to an embodiment may obtain an image an image (e.g., an HDR image/WCG image) of 16-bit data captured in a linear light format, in a 4:4:4 Red Green Blue (RGB) color space with floating point accuracy. The image processing apparatus 100 may convert the obtained image from a half-precision floating-point 4:4:4 RGB linear-light format to a single-precision floating-point format and then map the image in the single-precision floating-point format to an R'G'B' value of a floating point by using a perceptual quality (PQ) transfer function.

In operation 504, the image processing apparatus 100 may convert the mapped R'G'B' values to a floating-point Y'CbCr format.

In operation 506, the image processing apparatus 100 may detect a range of color components that constitutes the image. The image processing apparatus 100 may modify the image by expanding a range around a gamut mean from the range of each of the color components in the image, based on a scaling factor.

In operation 508, the image processing apparatus 100 may perform a quantization process. For example, the image processing apparatus 100 may convert the format of the image from a floating-point Y'CbCr format to a 10-bit fixed-point format ($Dy'Dc_bDc_r$).

According to an embodiment, the image processing apparatus 100 may perform a quantization process by using Equation 1. The image processing apparatus 100 may determine scaling factors so that resultant values Cb' and Cr' are within the range of 0 to 1.

$$D_{cb} = \text{Clip1}_c(\text{Round}((1<<(\text{BitDepth}_c-8))*(224*Cb'+128)))$$

$$D_{cb} = \text{Clip1}_c(\text{Round}((1<<(\text{BitDepth}_c-8))*(224*Cr'+128)))$$

$$Cb' = S_{cb}*(C_b - C_{b\ min}) + C_{b\ mid} - S_{cb}*(C_{b\ mid} - C_{b\ min})$$

$$Cr' = S_{cr}*(C_r - C_{r\ min}) + C_{r\ mid} - S_{cr}*(C_{r\ mid} - C_{r\ min}) \quad \text{[Equation 1]}$$

$C_{b\ min}$=Minimum Floating Point value for $C_b$ (blue-difference chroma component) of image $C_{r\ min}$=Minimum Floating Point value for $C_r$ (red-difference chroma component) of image $C_{b\ mid}$=Mean Floating Point value for $C_b$ for image $C_{r\ mid}$=Mean Floating Point value for $C_r$ for image $S_{cb}$=Scaling factor for $C_b$ $S_{cr}$=Scaling factor for $C_r$ In operation 510, the image processing apparatus 100 may down-sample data of the 10-bit fixed point format ($Dy'Dc_bDc_r$) from a 4:4:4 format to a 4:2:0 format.

In operation 512, the image processing apparatus 100 may encode the down-sampled data. For example, the image processing apparatus 100 may encode the down-sampled data by using an HEVC Main 10 Profile encoder (hereinafter, an HEVC encoder). An encoder may be implemented within the image processing apparatus 100 by using at least one processor. The image processing apparatus 100 may generate a bitstream including the encoded image and at least one or both of the scaling factor and gamut components, by using the encoder, for example, the HEVC encoder. The image processing apparatus 100 may signal the generated bitstream to a decoder for example, an HEVC Main 10 Profile decoder.

According to an embodiment, the gamut components may include minimum and maximum values of each of the color components before the range of each of the color components is expanded, and start and end points of the sub-range of each of the color components before the range of each of the color components is expanded. According to an embodiment, the image processing apparatus 100 may signal the gamut components to the decoder to recover the color components of the image. The image processing apparatus 100 may encode the gamut components in the bitstream as a portion of the bitstream or metadata.

According to an embodiment, the scaling factor may be a fixed scaling factor. A fixed offset and the fixed scaling factor may be determined based on at least one of content of the image and the range of the color components in the image.

According to an embodiment, when the scaling factor is a fixed scaling factor, the fixed offset may be determined based on the range of the color components in the image by using Equation 2.

$$C_b' = S_{Cb}*(C_b - Cb_{min}) + Cb_{mid}$$

$$C_r' = S_{Cr}*(C_r - Cr_{min}) + Cr_{mid} \quad \text{[Equation 2]}$$

$Cb_{min}$=Minimum floating point value for $C_b$, $Cr_{min}$=Minimum floating point value for $C_r$, $Cb_{mid}$=Mean floating point value for $C_b$, $Cr_{mid}$=Mean floating point value for $C_r$ $S_{Cb}$=Scaling factor for $C_b$, $S_{Cr}$=Scaling factor for $C_r$.

According to an embodiment, when the scaling factor is a fixed scaling factor, the fixed offset may be determined based on the content of the image by using Equation 3.

$$\text{Off}_{cb} = fn(C_b)$$

$$\text{Off}_{cr} = fn(C_r)$$

$$Cb' = S_{Cb}*Cb + \text{Off}_{Cb}$$

$$Cr' = S_{Cr}*Cr + \text{Off}_{Cr} \quad \text{[Equation 3]}$$

$S_{Cb}$=Scaling factor for $C_b$ $S_{Cr}$=Scaling factor for $C_r$ $\text{Off}_{Cb}$=Offset for $C_b$ $\text{Off}_{Cr}$=Offset for $C_r$ According to an embodiment, the scaling factor may be a dynamic scaling factor. The dynamic scaling factor and a dynamic offset may be determined based on at least one of the content of the image and a dynamic range of the image.

According to an embodiment, when the scaling factor is a dynamic scaling factor and scaling is performed on a color component value such that the range of each of the color components in the image is expanded to a permissible range of each of the color components, the dynamic offset may be determined based on the content of the image by using Equation 4.

$$S_{cb} = fn(C_b)$$

$$S_{cr} = fn(C_r)$$

$$Cb' = S_{Cb} * Cb + \text{Off}_{Cb}$$

$$Cr' = S_{Cr} * Cr + \text{Off}_{Cr} \quad \text{[Equation 4]}$$

$S_{Cb}$=Scaling factor for $C_b$
$S_{Cr}$=Scaling factor for $C_r$
$\text{Off}_{Cb}$=Offset for $C_b$
$\text{Off}_{Cr}$=Offset for $C_r$ According to an embodiment, when the scaling factor is a dynamic scaling factor and scaling is performed on the color component value such that the range of each of the color components in the image is expanded to the entire permissible range of each of the color components, the dynamic range of may be determined based on the dynamic range of the color components of the image by using Equation 5.

$$Cb' = \left(\frac{Cb - Cb\ \min}{Cb\ \max - Cb\ \min}\right) - 0.5 \quad \text{[Equation 5]}$$

$$Cr' = \left(\frac{Cr - Cr\ \min}{Cr\ \max - Cr\ \min}\right) - 0.5$$

$$C_b = (C_{b\ max} - C_{b\ min}) * (C'_b + 0.5) + C_{b\ min}$$

$$C_r = (C_{r\ max} - C_{r\ min}) * (C'_r + 0.5) + C_{r\ min}$$

$C_{b\ min}$ = Minimum Floating Point value for $C_b$ of image
$C_{r\ min}$ = Minimum Floating Point value for $C_r$ of image
$C_{b\ max}$ = Maximum Floating Point value for $C_b$ for image
$C_{r\ max}$ = Maximum Floating Point value for $C_r$ for image
$S_{cb}$ = Scaling factor for $C_b$
$S_{cr}$ = Scaling factor for $C_r$ According to an embodiment, when the scaling factor is a dynamic scaling factor, the dynamic scaling factor may be determined based on the dynamic range of the color components in the image by using Equation 6.

$$S_{cb} = \min\left(\text{abs}\left(\frac{0.5}{Cb\ \max}\right), \text{abs}\left(\frac{-0.5}{Cb\ \min}\right)\right) \quad \text{[Equation 6]}$$

$$S_{cr} = \min\left(\text{abs}\left(\frac{0.5}{Cr\ \max}\right), \text{abs}\left(\frac{-0.5}{Cr\ \min}\right)\right)$$

$C_{b\ min}$ = Minimum Floating Point value for $C_b$ of image
$C_{r\ min}$ = Minimum Floating Point value for $C_r$ of image
$C_{b\ max}$ = Maximum Floating Point value for $C_b$ for image
$C_{r\ max}$ = Maximum Floating Point value for $C_r$ for image
$S_{cb}$ = Scaling factor for $C_b$
$S_{cr}$ = Scaling factor for $C_r$ In operation 514, the image processing apparatus 300 may obtain a bitstream by using a decoder, for example, an HEVC decoder. For example, the image processing apparatus 300 may obtain a bitstream including the encoded image and at least one of the scaling factor and gamut components, by using the HEVC decoder. The image processing apparatus 300 may decode the encoded image, based on the encoded bitstream.

In operation 516, the image processing apparatus 300 may up-sample the decoded image from a 4:2:0 format to a 4:4:4 format.

In operation 518, the image processing apparatus 300 may perform de-quantization on the up-sampled image from the 10-bit fixed-point format (Dy'Dc$_b$Dc$_r$) to the floating-point Y'CbCr format.

In operation 520, the image processing apparatus 300 may recover the range of each of the color components in a decoded image including de-quantized data. According to an embodiment, the image processing apparatus 300 may recover a range around the gamut mean from the range of each of the color components in an expanded decoded image, based on at least one of the scaling factor and the gamut components.

In operation 522, the image processing apparatus 300 may convert the decoded image from the floating-point Y'CbCr format to the R'G'B' format.

In operation 524, the image processing apparatus 300 may convert the decoded image from a single-precision floating-point format to a half-precision floating-point 4:4:4 RGB linear-light format and may remap the converted decoded image to the 4:4:4 RGB color space with floating-point accuracy by using an inverse PQ transfer function. The image processing apparatus 300 may obtain an output image including floating-point accuracy data in the 4:4:4 RGB color space.

The quality of an image outputted from the HDR video coding pipeline of FIG. 5, according to an embodiment as disclosed herein, is improved compared with the quality of a recovered HDR image video according to the conventional art.

Figure 6:
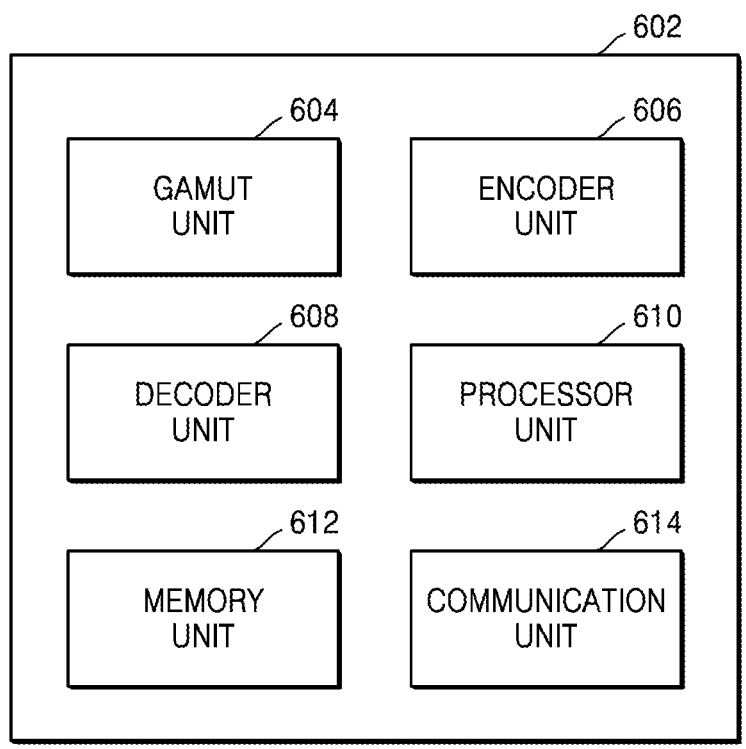
FIG. 6 is a block diagram of an apparatus for color management of an image, according to an embodiment.

FIG. 6 is a block diagram of an apparatus 602 for color management of an image, according to an embodiment. According to an embodiment, the apparatus 602 may be, for example, but not limited to, a mobile phone, a smart phone, personal digital assistants (PDAs), a tablet, a phablet, a smart appliance, a television, a consumer electronic device, a monitor, a dual display device, or any other electronic devices.

The apparatus 602 may include a gamut unit 604, an encoder unit 606, a decoder unit 608, a processor unit 610, a memory unit 612, and a communication unit 614.

The gamut unit 604 may detect the range of color components in the image. The gamut unit 604 may modify the image by expanding a range around a gamut mean from the range of each of the color components in the image, based on a scaling factor.

According to an embodiment, the gamut unit 604 may modify the image by expanding a range around a gamut mean from the range of each of the color components in the image, based on a scaling factor. The gamut unit 604 may determine gamut components for the range of color components, and expand the range around the gamut mean from the range of each of the color components based on the gamut components and the scaling factor. A method of expanding the range around the gamut mean from the range of each of the color components in the image based on the scaling factor is illustrated in conjunction with FIGS. 8A-8D.

According to an embodiment, the gamut unit 604 may modify the image by expanding the range around the gamut mean from the range of each of the color components in the image, based on the scaling factor. The gamut unit 604 may compute a plurality of sub-ranges of each of the color components. The gamut unit 604 may maintain the scaling factor for each of the sub-ranges. The gamut unit 604 may determine gamut components for the sub-ranges of each of the color components. The gamut unit 604 may expand a sub-range around the gamut mean from among the plurality of sub-ranges for each of the color components, based on the gamut components.

The encoder unit 606 may encode the modified image. Further, the encoder unit 606 may signal a bitstream including the encoded image together with at least one of the scaling factor and the gamut components to the decoder unit 608.

The decoder unit 608 may receive the bitstream including the encoded image together with at least one of the scaling factor and the gamut components. Further, the decoder unit 608 may decode the encoded image. After decoding the encoded image, the decoder unit 608 may signal the decoded image to the gamut unit 602.

According to an embodiment, the gamut unit 602 may recover a range around a gamut mean from a range of each of the color components in an expanded decoded image, based on at least one of the scaling factor and the gamut components.

According to an embodiment, the gamut unit 602 may obtain gamut components of the color components based on the scaling factor. For example, the gamut unit 602 may obtain the gamut components of the color components from pixel values of the decoded image obtained by the decoder unit 608 and the scaling factor.

The processor 610 may be, for example, but is not limited to, a hardware unit, an apparatus, a CPU, or a GPU communicatively coupled to the memory unit 612 (e.g., a volatile memory and/or a non-volatile memory). The memory unit 612 may include storage locations that may be accessed via the processor 610. Further, the memory unit 612 may include non-volatile storage elements. Examples of such non-volatile storage elements may include magnetic hard discs, optical discs, floppy discs, flash memories, electrically programmable memories (EPROM), or electrically erasable and programmable memories (EEPROM). In addition, the memory unit 612 may be a non-transitory storage medium. The term "non-transitory" may indicate that the storage medium is not embodied in a carrier wave or a propagated signal. However, the term "non-transitory" should not be interpreted to mean that the memory unit 612 is non-movable. According to an embodiment, the memory unit 612 may store a larger amount of information than said above. For example, a non-transitory storage medium may store data that may change over time (e.g., in random access memory (RAM) or cache). The communication unit 614 may be configured for communicating internally between the units and externally with networks.

FIG. 6 shows an overview of the apparatus 602. However, it is to be understood that other embodiments are not limited thereto. The apparatus 602 may include other units along with other hardware or software components that communicate with each other. For example, the apparatus 602 may further include, but is not limited to, a process running in a controller or processor, an object, an executable process, a thread of execution, a program, or a computer. For example, both an application running on a device and the device itself may be a component.

In FIG. 6, the term "unit" indicates a module implemented using hardware instead of a software module. A unit may be implemented using hardware including at least one processor.

Figure 7:
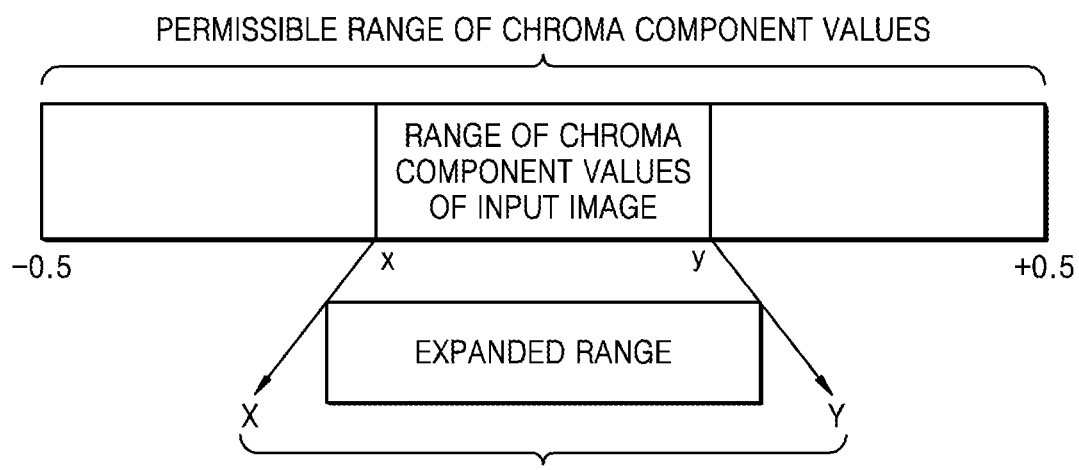
FIG. 7 illustrates an example in which a range around a gamut mean from a range of each of color components in an image is expanded based on a scaling factor, according to an embodiment.

FIG. 7 illustrates an example in which a range around a gamut mean from a range of each of color components in an image is expanded based on a scaling factor, according to an embodiment. As shown in FIG. 7, a total permissible range for the color components of the image is −0.5 to 0.5, whereas the range of chroma values of an input image may be a range of x to y. Based on the range of the chroma values of the input image, considerable precision losses are generated while pixel values are quantized from a 16-bit floating-point format to a 10-bit fixed-point format, and accordingly, inaccurate representation of colors and intensity in the decoded image occurs.

In order to avoid the inaccurate representation of the colors and intensity in the decoded image, various embodiments according to the present disclosure enhances the quality of an HDR image by modifying the image by expanding the range around the gamut mean from the range of each of the color components in the image based on a scaling factor. As shown in FIG. 7, according to an embodiment, the range of each of the color components may be extended from the range of x to y to a range of X to Y.

Figure 8A:
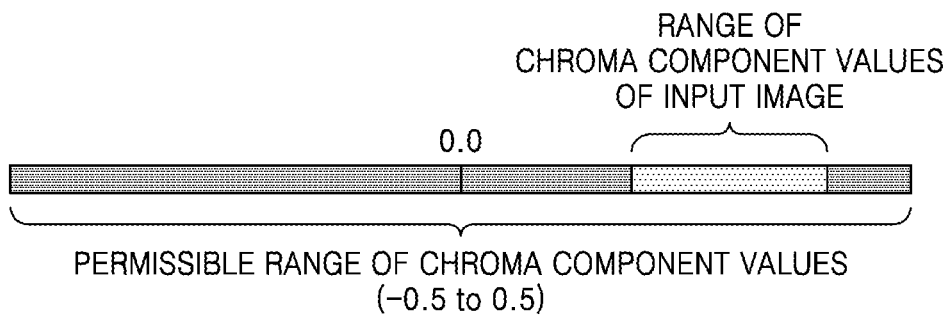
FIGS. 8A-8D illustrate an example in which the range around the gamut mean from the range of each of the color components in the image is expanded based on a fixed scaling factor and a dynamic scaling factor, according to an embodiment.

FIGS. 8A-8D illustrate an example in which the range around the gamut mean from the range of each of the color components in the image is expanded based on a fixed scaling factor and a dynamic scaling factor, according to an embodiment. Referring to FIG. 8A, a total permissible range of the color components of the image may be −0.5 to 0.5, whereas the range of chroma values of an input image may be a range of x to y.

Figure 8B:
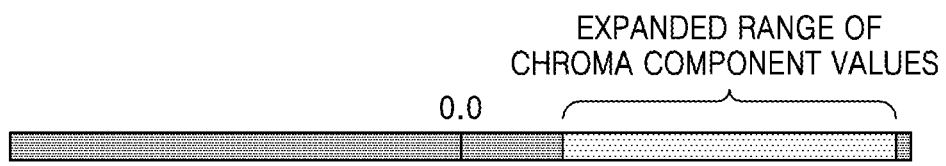

Referring to FIG. 8B, according to an embodiment, a fixed offset and the fixed scaling factor may be determined based on at least one of content of the image and the range of the color components in the image. According to an embodiment, the fixed offset may be determined by using Equations 2 and 3.

Figure 8C:
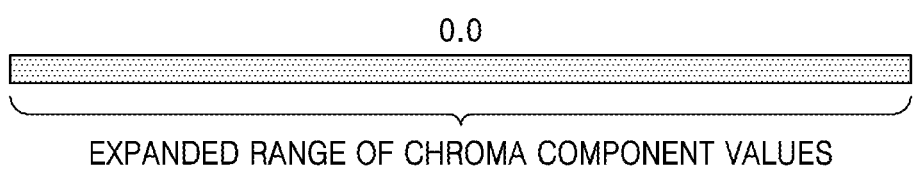
Figure 8D:
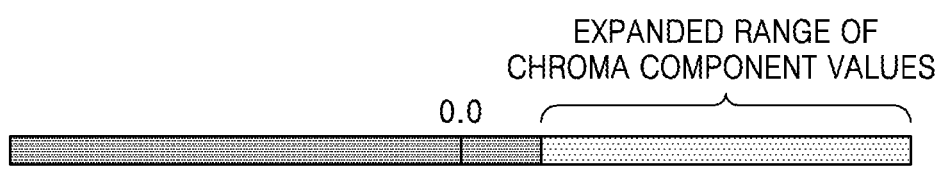

Referring to the FIG. 8C, according to an embodiment, the scaling factor may be a dynamic scaling factor, and scaling may be performed such that the range of each of the color components in the image may be expanded to a full permissible range of each of the color components in the image. Referring to the FIG. 8D, the scaling factor may be a dynamic scaling factor, and scaling may be performed such that the range of each of the color components in the image may be expanded to at least one of an upper limit and a lower limit of the full permissible range of each of the color components in the image. According to an embodiment, a dynamic offset may be determined based on the content of the image by using Equations 4-6.

FIG. 9 is a flowchart of a method of color management of the image, according to an embodiment.

In operation 910, the gamut unit 604 may detect the range of the color components in the image.

In operation 920, the gamut unit 604 may modify the image by expanding a range around a gamut mean from the range of each of the color components in the image, based on a scaling factor.

In operation 930, the encoder unit 606 may encode an image in which the range of the color components has been modified.

In operation 940, the encoder unit 606 may signal a bitstream including the encoded image together with at least one of the scaling factor and the gamut components to the decoder unit 608.

In operation 950, the decoder unit 608 may receive the bitstream including the encoded image together with at least one of the scaling factor and the gamut components. In operation 960, the decoder unit 608 may decode the encoded image.

In operation 970, the gamut unit 604 may determine the gamut components of the color components of the image, based on the scaling factor.

In operation 980, the gamut unit 604 may recover the range around the gamut mean from the expanded range of each of the color components in the decoded image, based on the gamut components.

The various actions, acts, blocks, steps, or the like in the flowchart may be performed in the order presented, in a different order, or simultaneously. Further, in some embodiments, some of the actions, acts, blocks, steps, or the like may be omitted, added, modified, or the like without departing from the scope of the invention.

Figure 10:
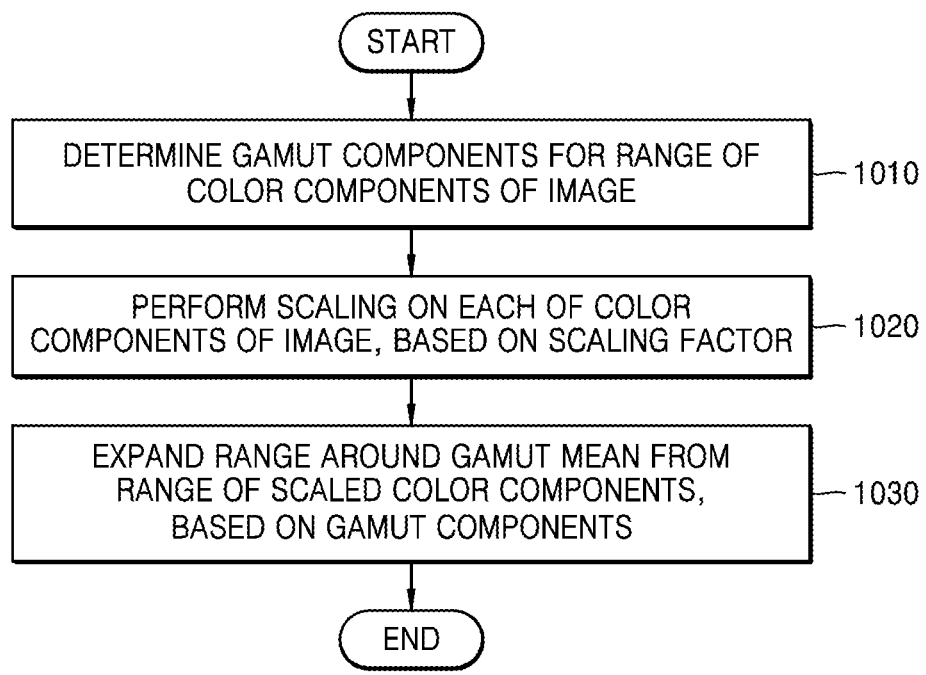
FIG. 10 is a flowchart of a method of modifying the image by expanding the range around the gamut mean from the range of each of the color components in the image, based on the scaling factor, according to an embodiment.

FIG. 10 is a flowchart of a method of modifying the image by expanding the range around the gamut mean from the range of each of the color components in the image, based on the scaling factor, according to an embodiment.

In operation 1010, the gamut unit 604 may determine gamut components for the range of the color components of the image.

In operation 1020, the gamut unit 604 may perform scaling on each of the color components of the image, based on the scaling factor.

In operation 1030, the gamut unit 604 may expand a range around the gamut mean or a gamut median from the range of the scaled color components, based on the gamut components.

The various actions, acts, blocks, steps, or the like in the flowchart may be performed in the order presented, in a different order, or simultaneously. Further, in some embodiments, some of the actions, acts, blocks, steps, or the like may be omitted, added, modified, or the like without departing from the scope of the invention.

Figure 11:
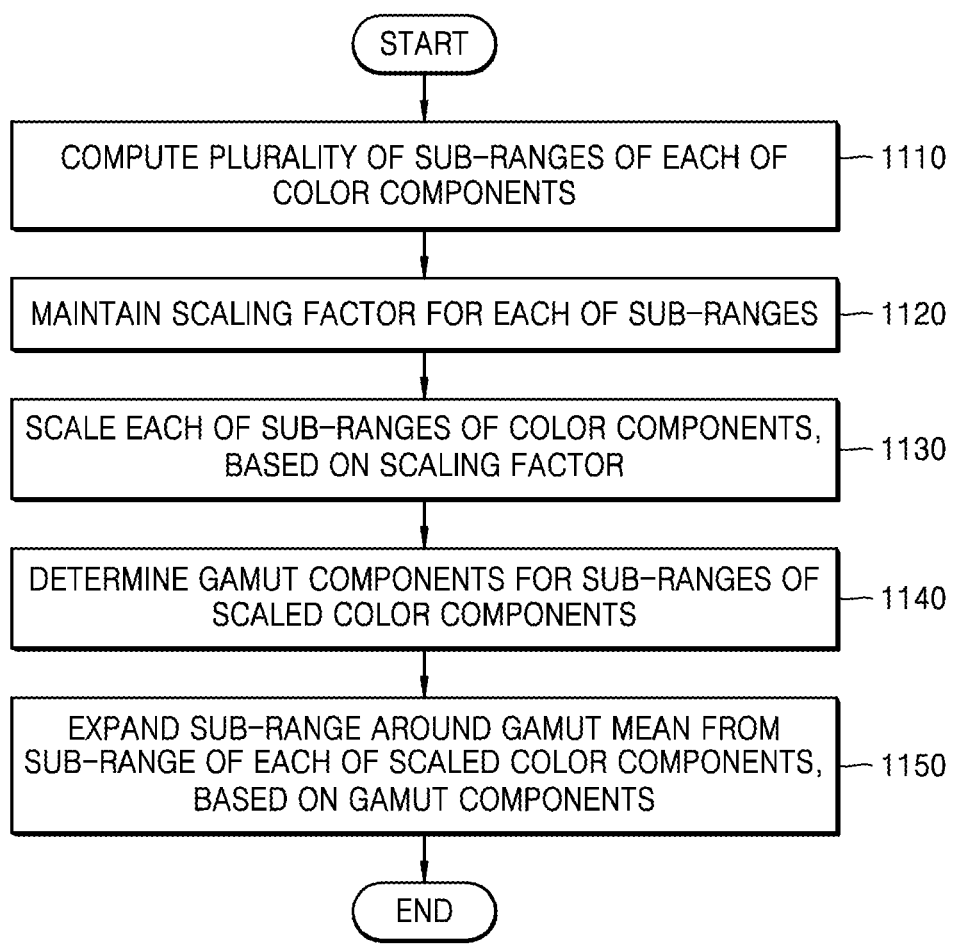
FIG. 11 is a flowchart of a method of modifying the image by expanding the range around the gamut mean from the range of each of the color components in the image, based on the scaling factor, according to another embodiment.

FIG. 11 is a flowchart of a method of modifying the image by expanding the range around the gamut mean from the range of each of the color components in the image, based on the scaling factor, according to another embodiment.

In operation 1110, the gamut unit 604 may compute a plurality of sub-ranges of each of the color components.

In operation 1120, the gamut unit 604 may maintain the scaling factor for each of the sub-ranges.

In operation 1130, the gamut unit 604 may scale each of the subranges of the color components, based on the scaling factor.

In operation 1140, the gamut unit 604 may determine gamut components for the sub-ranges of the scaled color components.

In operation 1150, the gamut unit 604 may expand a sub-range around the gamut mean from the sub-range of each of the scaled color components, based on the gamut components.

The various actions, acts, blocks, steps, or the like in the flowchart may be performed in the order presented, in a different order, or simultaneously. Further, in some embodiments, some of the actions, acts, blocks, steps, or the like may be omitted, added, modified, or the like without departing from the scope of the invention.

Figure 12:
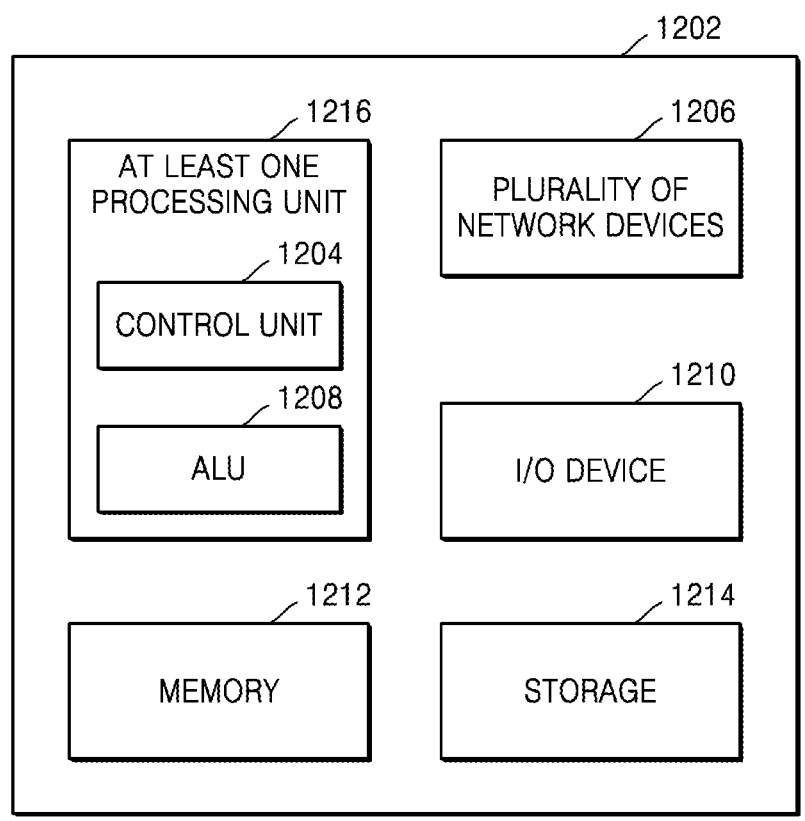
FIG. 12 is a block diagram of a computing environment for implementing a method and a system for color management of an image, according to an embodiment.

FIG. 12 illustrates a computing environment for implementing the method and system for color management of the image, according to an embodiment. As shown in FIG. 12, a computing environment 1202 may include at least one processing unit 1216, a memory 1212, a storage 1214, a plurality of network devices 1206, and an input/output (I/O) device 1210, wherein the at least one processing unit 1216 includes a control unit 1204 and an arithmetic logic unit (ALU) 1208. The processing unit 1216 may process instructions of schemes. The processing unit 1216 may receive commands from the control unit 1204 in order to perform its processing. Further, the processing unit 1216 may perform any logical and arithmetic operations involved in execution of the commands by using the ALU 1208.

The overall computing environment 1202 may include, but is not limited to, a plurality of homogeneous or heterogeneous cores, a plurality of CPUs of different kinds, special media, and other accelerators. The processing unit 1216 may process instructions of the schemes. Further, the plurality of processing units 1216 may be located on a single chip or over a plurality of chips.

The scheme may include instructions and codes required for implementation. The instructions and codes may be stored in either the memory unit 1212 or the storage 1214 or both. During execution, the instructions may be fetched from the corresponding memory 1212 or storage 1214, and executed by the processing unit 1216.

Further, the storage 1214 may include non-volatile storage elements. Examples of such non-volatile storage elements may include, but are not limited to, magnetic hard discs, optical discs, floppy discs, flash memories, or EPROMs and EEPROMs. In addition, the storage 1214 may be a non-transitory storage medium. The term "non-transitory" may indicate that the storage medium is not embodied in a carrier wave or a propagated signal. However, the term "non-transitory" should not be interpreted to mean that the memory unit 1214 is non-movable. According to an embodiment, the storage 1214 may store a larger amount of information than said above. For example, a non-transitory storage medium may store data that may change over time (e.g., in RAM or cache).

In connection with any hardware implementations, various networking devices 1206 or external I/O devices 1210 may be connected to the computing environment 1202 to support the implementation through a networking unit and an I/O device unit.

The embodiments disclosed herein may be implemented through at least one software program that runs on at least one hardware device and performs network management functions to control the elements. The elements shown in the FIGS. 1-6 and 9-12 may include blocks which may be at least one hardware device, or a combination of a hardware device and software units.

Although the embodiments of the present invention have been disclosed for illustrative purposes, one of ordinary skill in the art will appreciate that diverse variations and modifications are possible, without departing from the spirit and scope of the invention. Thus, the above embodiments should be understood not to be restrictive but to be illustrative, in all aspects. For example, respective elements described in an integrated form may be dividedly used, and the divided elements may be used in a state of being combined.

The invention claimed is:

1. An image processing method comprising:
   obtaining a color component value from an input image, wherein the color component value represents a chrome component;
   determining a dynamic range of the obtained color component value;
   determining a scaling factor for converting the dynamic range of the color component value, based on the determined dynamic range of the color component value and a permissible range of the color component value, wherein the permissible range is a range from a lowest limit value of obtainable color component values to a highest limit value of the obtainable color component values; and scaling the color component value, based on the determined scaling factor such that a range around a gamut mean from the dynamic range of the color component value is expanded based on the scaling factor.

2. The image processing method of claim 1, further comprising:

changing a format of the scaled color component value by quantization of the input image based on a converted dynamic range of the scaled color component value; and encoding the quantized input image.

3. The image processing method of claim 2, further comprising generating a bitstream including the encoded input image and the scaling factor.

4. The image processing method of claim 1, wherein the determining of the scaling factor comprises determining, as the scaling factor, a smaller ratio size from among a ratio size of an upper limit of the permissible range to an upper limit of a color component corresponding to the dynamic range and a ratio size of a lower limit of the permissible range to a lower limit of the color component corresponding to the dynamic range.

5. The image processing method of claim 1, wherein the determining of the scaling factor comprises determining, as the scaling factor, a ratio of a difference between an upper limit and a lower limit of the permissible range to a difference between an upper limit and a lower limit of a color component corresponding to the dynamic range.

6. An image processing apparatus comprising:

a storage storing a color component value obtained from an input image, wherein the color component value represents a chrome component; and at least one processor configured to determine a dynamic range of the obtained color component value, determine a scaling factor for converting the dynamic range of the color component value, based on the determined dynamic range of the color component value and a permissible range of the color component value, and scale the color component value, based on the determined scaling factor such that a range around a gamut mean from the dynamic range of the color component value is expanded based on the scaling factor, wherein the permissible range is a range from a lowest limit value of obtainable color component values to a highest limit value of the obtainable color component values.

7. The image processing apparatus of claim 6, wherein the processor is further configured to determine, as the scaling factor, a smaller ratio size from among a ratio size of an upper limit of the permissible range to an upper limit of a color component corresponding to the dynamic range and a ratio size of a lower limit of the permissible range to a lower limit of the color component corresponding to the dynamic range.

8. The image processing apparatus of claim 6, wherein the processor is further configured to determine, as the scaling factor, a ratio of a difference between an upper limit and a lower limit of the permissible range to a difference between an upper limit and a lower limit of a color component corresponding to the dynamic range.

9. An image processing method comprising:

obtaining an encoded image and a scaling factor from a received bitstream;

obtaining a quantized image by decoding the encoded image;

obtaining a color component value scaled based on the scaling factor, by dequantizing the quantized image, wherein the color component value represents a chrome component; and inversely scaling the scaled color component value, based on the scaling factor, wherein the scaling factor for converting a dynamic range of the color component value is determined based on the dynamic range of the color component value and a permissible range of the color component value, wherein a dynamic range of the scaled color component value corresponds to an expanded dynamic range of the color component value in which a range around a gamut mean from the dynamic range of the color component value is expanded based on the scaling factor, and wherein the permissible range is a range from a lowest limit value of obtainable color component values to a highest limit value of the obtainable color component values.

10. The image processing method of claim 9, further comprising obtaining an upper limit and a lower limit of a color component corresponding to a dynamic range of an unscaled color component value from the bitstream, wherein the inverse scaling of the scaled color component value comprises inversely scaling the scaled color component value, based on the scaling factor and the upper limit and the lower limit of the color component corresponding to the dynamic range of the unscaled color component value.

11. The image processing method of claim 9, wherein the scaling factor is a smaller ratio size from among a ratio size of an upper limit of the permissible range obtained from an input image to an upper limit of a color component corresponding to the dynamic range and a ratio size of a lower limit of the permissible range to a lower limit of the color component corresponding to the dynamic range.

12. The image processing method of claim 9, wherein the scaling factor is a ratio of a difference between an upper limit and a lower limit of the permissible range obtained from an input image to a difference between an upper limit and a lower limit of a color component corresponding to the dynamic range.

13. An image processing apparatus comprising:

an obtainer configured to obtain an encoded image and a scaling factor from a bitstream; and at least one processor configured to obtain a quantized image by decoding the encoded image, obtain a color component value scaled based on the scaling factor, by dequantizing the quantized image, and inversely scale the scaled color component value, based on the scaling factor, wherein the color component value represents a chrome component, wherein the scaling factor for converting a dynamic range of the color component value is determined based on the dynamic range of the color component value and a permissible range of the color component value, wherein a dynamic range of the scaled color component value corresponds to an expanded dynamic range of the color component value in which a range around a gamut mean from the dynamic range of the color component value is expanded based on the scaling factor, and wherein the permissible range is a range from a lowest limit value of obtainable color component values to a highest limit value of the obtainable color component values.

14. The image processing apparatus of claim 13, wherein the processor is further configured to obtain an upper limit and a lower limit of a color component corresponding to a dynamic range of an unscaled color component value from the bitstream, and inversely scale the scaled color component value, based on the scaling factor and an upper limit and a lower limit of the color component corresponding to the dynamic range of the unscaled color component value.

15. A non-transitory computer-readable recording medium having recorded thereon a program, which, when executed by a computer, performs the method of claim 1.

* * * * *